United States Patent
Watts

[11] 3,749,178
[45] July 31, 1973

[54] TWO WAY GANG PLOW WITH VARIABLE NUMBER BOTTOMS

[76] Inventor: Glen A. Watts, Rt. 1, Box 258, McMinnville, Oreg. 97127

[22] Filed: Sept. 23, 1971

[21] Appl. No.: 183,212

[52] U.S. Cl.................. 172/225, 172/212, 172/253
[51] Int. Cl............................................ A01b 3/28
[58] Field of Search................... 172/212, 223–225, 172/253, 282, 286, 288, 291

[56] References Cited
UNITED STATES PATENTS

| | | | |
|---|---|---|---|
| 3,523,584 | 8/1970 | Godbersen | 172/223 |
| 2,760,420 | 8/1956 | Pursche | 172/212 |
| 825,145 | 7/1906 | Melvin | 172/280 |
| 3,625,294 | 12/1971 | Markoski | 172/282 |
| 1,335,636 | 3/1920 | Bailey | 172/253 |
| 2,016,518 | 10/1935 | Rutter | 172/253 |

FOREIGN PATENTS OR APPLICATIONS

| | | | |
|---|---|---|---|
| 1,141,941 | 2/1969 | Great Britain | 172/253 |
| 950,912 | 2/1964 | Great Britain | 172/223 |

OTHER PUBLICATIONS
Atlas Scraper and Engineering Co., "Atlas Two-Way Plows" 5-11-1950, Bulletin P 483.

*Primary Examiner*—Robert E. Pulfrey
*Assistant Examiner*—Paul T. Sewell
*Attorney*—Oliver D. Olson

[57] ABSTRACT

An elongated support beam, arranged for connection at its front end to a pulling tractor and supported at its rear end by a vertically adjustable carrier wheel, pivotally mounts a framework carrying a pair of plow gangs. The gangs are disposed on a line disposed obliquely to the support beam and extending rearward of the carrier wheel and are rotatable with the framework to position each gang selectively in its ground working position. A pair of tail wheels, one associated with each gang, is mounted detachably at the trailing end of the gangs for rotation therewith. Additional plow bottoms may be added to the trailing end of the gangs by detaching the pair of tail wheels and attaching the latter to the trailing end of the added plow bottoms. Means may be provided for rendering the carrier wheels steerable in response to turning of the tractor.

10 Claims, 4 Drawing Figures

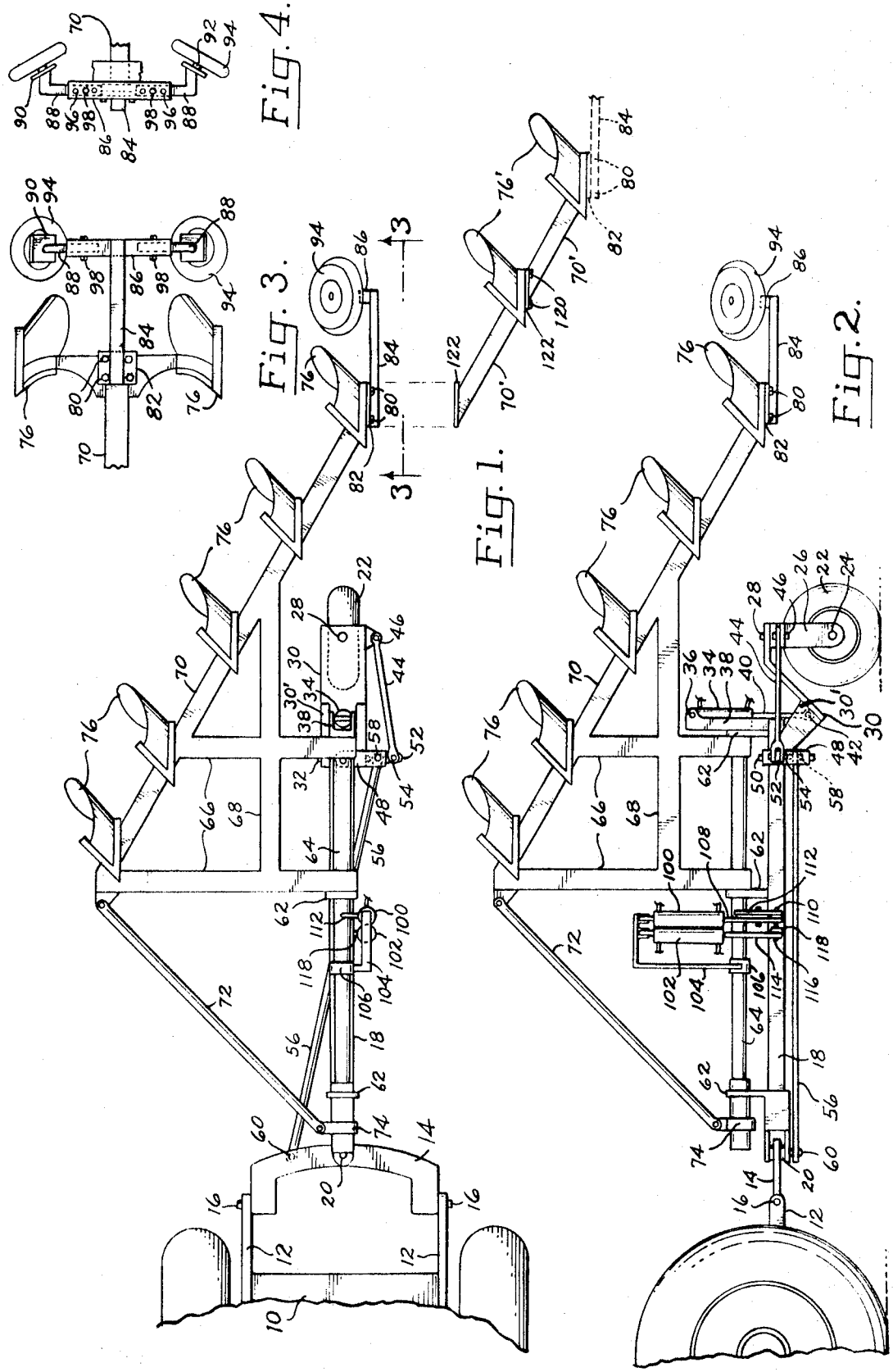

TWO WAY GANG PLOW WITH VARIABLE NUMBER BOTTOMS

BACKGROUND OF THE INVENTION

This invention relates to earth-working plows, and more particularly to a two-way gang plow in which the number of plow bottoms is capable of being varied.

Two-way gang plows have been provided heretofore in a variety of constructions. One such plow construction is disclosed in my earlier U. S. Pat. No. 3,507,334. It is characteristic of such prior plow constructions that an elongated support beam extends rearward of the plows and a tail wheel is mounted at the rear end of the beam for carrying the rear end of the plow assembly. This tail wheel also is vertically adjustable for supporting the plow bottoms in proper working position relative to the ground. Also, the tail wheel is positioned rearward of and in line with the trailing plow, to travel against the solid side of its furrow to prevent side slippage of the plow assembly. However, such prior plow constructions prevent the addition of plow bottoms to a particular gang assembly, since no means is provided for repositioning the tail wheel rearward of and in line with the trailing additional plow. Moreover, with the tail wheel mounted on the beam, it is necessary that the gang assemblies terminate well forward of the tail wheel, in order to accommodate rotation of the gangs to their respective ground working positions.

SUMMARY OF THE INVENTION

In its basic concept, this invention provides a plow constrcution in which a pair of two-way plow gangs is mounted pivotally on a tractor-pulling support beam and extends rearwardly thereof, permitting additional plow bottoms to be added to the rear end of the gangs. A tail wheel assembly arranged for associations with each gang is secured detachably to the rear end of the gang assemblies, and a vertically adjustable carrier wheel is mounted at the rear end of the support beam.

It is by virtue of the foregoing basic concept that the principal objective of this invention is achieved; namely, to overcome the aforementioned disadvantages of prior two-way gang plow constructions.

Another important object of this invention is the provision of a two-way gang plow of the class described in which simplified means is provided for rendering the carrier wheel steerable in response to turning of the tractor.

A further important object of this invention is the provision of a two-way gang plow of the class described which is of simplfied construction for economical manufacture.

The foregoing and other objects and advantages of this invention will appear from the following detailed description taken in connection with the accompanying drawing of a preferred embodiment.

BRIEF DESCRIPTION OF THE DRAWING

FIG. 1 is a fragmentary, exploded plan view of a two-way gang plow embodying the features of this invention, the plow gangs being shown in ground working position for turning earth to the right of the direction of tractor travel.

FIG. 2 is a fragmentary view in side elevation of the two-way gang plow shown in FIG. 1, the plow gangs being shown in elevated, inoperative position.

FIG. 3 is a fragmentary view in side elevation as viewed in the direction of the arrows 3—3 in FIG. 1.

FIG. 4 is a fragmentary rear end elevation as viewed from the right in FIG. 3.

DESCRIPTION OF THE PREFERRED EMBODIMENT

The plow of this invention is adapted to be pulled behind a tractor 10. For this purpose the tractor is provided at its rear end with lift bars 12 to which is detachably mounted a drawbar 14 for pivotal movement on the transverse axis of pivot shafts 16.

The plow of this invention includes an elongated support beam 18 provided at its front end with a vertical pivot 20 for connection to the drawbar 14. The rear end of the beam is supported in vertically adjustable position above the ground by a carrier wheel 22. For this purpose, wheel axle 24 extends between spaced arms 26 of a yoke member, the upper end of which is connected, preferably by a pivot 28, to the rear end of a suspension arm 30. The arms 26 and pivot 28 form a vertical pivot for the carrier wheel. The forward end of the arm 30, formed by spaced plates 30', is connected to the beam 18 adjacent the rear end thereof, by means of a horizontal transverse pivot shaft 32.

It will be understood that the support bracket for the carrier wheel may be designed to support a pair of laterally spaced carrier wheels, if additional lateral stability for the plow assembly is desired.

Power means is provided for pivoting the suspension arm 30 about its mounting shaft 32 to effect vertical adjustment of the beam 18 relative to the ground. In the embodiment illustrated, such power means is provided by a hydraulic piston-cylinder unit. In the arrangement illustrated, the upper end of the cylinder 34 of the unit is supported pivotally, by means of a pivot pin 36, at the upper end of an upstanding mounting bracket 38 at the rear of the beam. The lower end of the piston rod 40 of the unit projecting from the cylinder is connected pivotally to the suspension arm 30, intermediate the ends of the latter, by means of a pivot pin 42. Thus, by appropriate application of hydraulic pressure to the opposite ends of the cylinder, extension and retraction of the piston rod effects clockwise and counterclockwise rotation of the suspension arm about its pivot shaft, to effect raising and lowering of the beam 18.

As previously mentioned, the carrier wheel 22 preferably is connected to the suspension arm by a vertical pivot 26, 28, whereby to render the wheel steerable. For this purpose, means is provided for effecting turning of the wheel automatically in response to turning of the tractor 10. Accordingly, the rear end of a link 44 is connected to one of the yoke arms 26, as by means of a pivot pin 46. The forward end of the link is connected through a universal joint to a pivot bracket 48 mounted on the beam 18 by a vertical pivot pin 50. In the embodiment illustrated, the universal connection to the bracket is provided by a shaft 52 journaled in the bracket 48 for rotation on a transverse horizontal axis, and a pivot pin 54 extending through the shaft 52 and the front end of the link 44 on a substantially vertical axis.

The axis of the shaft 52 is aligned with the axis of the pivot shaft 32 mounting the suspension arm 30. By this means the suspension arm may be pivoted through its range by means of the disclosed hydraulic piston-cylinder unit without changing the steering position of the carrier wheel.

Also connected to the pivot bracket 48 is the rear end of a second elongated link 56, as by means of a pivot pin 58. This link extends forward, diagonally under the beam 18, and is connected at its forward end to the drawbar 14, as by a pivot pin 60. This diagonal arrangement of the link 56 to opposite sides of the beam 18 results in the turning of the carrier wheel 22 in the direction opposite the direction of turning of the tractor. By this arrangement the turning radius of the tractor and plow assembly is minimized. The arrangement of the linkage assembly preferably is such as to cause the carrier wheel to turn in said opposite direction through the same degree of arc as the tractor. However, it will be understood that the linkage assembly may be arranged to provide a turning arc for the carrier wheel different from that of the tractor.

Mounted above and parallel to the support beam 18, by means of bearing brackets 62, is an elongated tubular shaft 64. Secured to this shaft for rotation therewith is a gang plow framework comprising the lateral beams 66, longitudinal beam 68 and diagonal beam 70. A brace link 72 interconnects the outer end of the framework and a collar 74 on the forward end of the shaft. A plurality of pairs of plow bottoms 76 are mounted on the diagonal beam at appropriately spaced intervals, the plow bottoms of each pair extending to opposite sides of the diagonal beam, as illustrated in FIG. 3. The plow bottoms on one side of the beam form one gang, and the plow bottoms on the other side of the beam form a second gang, as will be understood.

It is an important feature of this invention that the diagonal beam 70, and therefore the plow bottoms of each gang, extend on a line disposed obliquely with respect to the longitudinal axis of the support beam 18 and to the rear of the carrier wheel 22.

The rear end of the diagonal beam is supported by a tail wheel assembly. In the embodiment illustrated, the rear end of the diagonal beam is provided with a flange disposed in a plane substantially parallel to the longitudinal axis of the support beam 18. The flange functions to secure, by such means as bolts 80, a flange 82 secured to the front end of a tail wheel support beam 84. Secured to the rear end of this beam, and extending substantially normal thereto and to opposite sides thereof, is an elongated tubular sleeve 86. Inserted in each of the opposite ends of the sleeve is a post 88 the outer end of which mounts an axle support plate 90. The post and support plate form between them an included acute angle, as illustrated. Projecting outward from the support plate, substantially normal thereto, is a wheel axle 92 which removably mounts a tail wheel 94.

As best shown in FIGS. 3 and 4, the pair of tail wheels 94 are disposed for cooperation one with each of the plow gangs, and each functions as a gage wheel to limit the penetration of the associated plow bottoms into the ground.

The tail wheels preferably are adjustable relative to the plow bottoms. In the embodiment illustrated, such adjustment is provided by a plurality of longitudinally spaced openings 96 in the sleeve 86 for selective registration with an opening through the post, for the reception of an anchor bolt 98. The post thus may be extended from the sleeve to any desired degree, whereby to vary the elevation of the rear end of the diagonal beam 70 relative to the ground.

Although the illustrated provision of a pair of tail wheels is preferred, for its simplicity of construction and manipulation, it will be understood that a single tail wheel may be mounted at the rear of the support beam 84 for adjustment to the alternate positions of the two wheels illustrated. This may be accomplished, for example, by mounting one end of the sleeve 86 on the beam 84 for rotation through substantially 180°. Any conventional locking means may be used to secure the beam in said 180° positions.

Means is provided for rotating the framework and supported plow gangs selectively to opposite sides of the support beam 18 for plowing earth to the right and left of the latter. In the embodiment illustrated, such means is provided by a pair of piston-cylinder units arranged in a manner analogous to that disclosed in detail in my earlier U. S. Pat. No. 3,507,334 referred to hereinbefore. Thus, the cylinders 100 and 102 of the units are supported at their upper ends pivotally by a bracket 104 seucred to a sleeve 106 journaled on the shaft 64. The piston rod 108 of cylinder 100 is connected pivotally at its lower end, by means of a pivot pin 110, to a bracket 112 projecting radially from the shaft 64. The piston rod 114 of the other cylinder 102 is connected pivotally at its lower end, by means of a pivot pin 116, to a bracket 118 secured to the support beam 18.

To pivot the framework and plow gang from the operative, right hand position illustrated in FIG. 1 to the upright, inoperative position illustrated in FIG. 2, hydraulic fluid under pressure is applied to the top end of the cylinder 100 to cause extension of its piston rod 108 to the position shown in FIG. 2. This extension of the piston rod thus effects rotation of the shaft 64 and corresponding rotation of the framework and plow gangs to the position illustrated in FIG. 2.

To rotate the framework and plow gangs further to bring the plow gangs into operative position for plowing earth to the left of the support beam 18, hydraulic fluid under pressure is applied to the bottom end of the cylinder 102 to cause retraction of its associated piston rod 114. This retraction results in further rotation of the shaft 64 and supported framework to bring the plow gang into operative, ground-engaging position to the left of the support beam 18.

Rotation of the framework and plow gangs from the left hand operative position back through the elevation position of FIG. 2 to the right hand operative position of FIG. 1, is effected by reversal of the above described operation of the piston-cylinder units, as will be understood.

It will be understood that the foregoing rotations of the framework and plow gangs is effected after the beam 18 has been elevated to raise the gangs above their respective ground-working positions. This is achieved by applying hydraulic fluid under pressure to the upper end of the cylinder 34 to cause extension of its associated piston rod 40 and consequent clockwise rotation of the arm 30 supporting the carrier wheel 22.

The arrangement of the plow gangs on the diagonal beam 70 extending rearward of the carrier wheel 22 permits the addition to the trailing end of the diagonal beam of additional plow bottoms. Referring to FIG. 1 of the drawing, there is shown two additional pairs of plow bottoms 76' each mounted on diagonal beam sections 70' interconnected by bolts 120 through cooperating connecting flanges 122. These may be secured to the trailing end of the diagonal beam 70 by removing the tail wheel assembly from the position illustrated and securing the flange 122 at the leading end of the interconnected sections 70' to the trailing end of the diagonal beam 70. Thereafter, the tail wheel assembly is secured to the trailing end of the added sections 70' by connecting the flange 82 on the tail wheel assembly to the corresponding flange on the trailing end of the section 70' supporting the trailing pair of added plow bottoms.

Thus, it is a feature of this invention that the diagonal beam component of the framework may be provided in at least two separable longitudinal sections 70 and 70' each mounting at least one pair of plow bottoms and arranged for detachable interconnection of each trailing section to the trailing end of the next leading section. The tail wheel assembly also is detachable so as to accommodate the attachment of additional trailing framework sections, whereupon the tail wheel assembly is attached to the trailing end of the last trailing section of framework.

The number of pairs of plow bottoms capable of being added to the main diagonal beam section 70 is variable up to the limit capable of being supported in elevated position above the ground in the position of FIG. 2 by clockwise rotation of the carrier wheel suspension arm 30 from the position illustrated in FIG. 2.

From the foregoing it will be appreciated that the present invention provides a two-way gang plow of economical but rugged construction, in which the number of pairs of plow bottoms may be varied over a substantial range. This is achieved by positioning the plow gangs on a line which extends rearward of a carrier wheel mounted at the rear of a support beam. The carrier wheel may be rendered steerable in response to the turning of a pulling tractor, whereby to minimize the turning radius of the assembly.

It will be apparent to those skilled in the art that various changes may be made in the size, shape, type, number and arrangement of parts described hereinbefore without departing from the spirit of this invention.

Having now described my invention and the manner in which it may be used, I claim:

1. A two-way gang plow, comprising
   a. an elongated support,
   b. means on the front end of the support for securing the same to a pulling vehicle,
   c. a single carrier wheel on the rear end of the support mounted for vertical adjustment relative to the support,
   d. a plow framework,
   e. means mounting the framework on the support for rotation on an axis substantially parallel to the longitudinal axis of the support,
   f. a plurality of spaced pairs of plow bottoms mounted on the framework on a line disposed obliquely to the longitudinal axis of the support and outwardly of the carrier wheel, the framework and the plow bottoms extending forward and rearward of the carrier wheel, one plow bottom of each pair forming one gang and the other plow bottom of each pair forming a second gang,
   g. tail wheel means, and
   h. means mounting the tail wheel means on the trailing end of the framework for association with each of said gangs in the ground working position of the latter.

2. The two-way gang plow of claim 1 wherein the framework includes at least two separate sections each mounting at least one pair of plow bottoms and each trailing section being secured to the trailing end of the next leading section.

3. The two-way gang plow of claim 1 wherein the tail wheel means is mounted on the trailing end of the framework and disposed rearward of and in alignment with the trailing plow bottom pair.

4. The two-way gang plow of claim 1 wherein the tail wheel means comprises a pair of tail wheels mounted for association one with each gang.

5. The two-way gang plow of claim 1 wherein the framework mounting means comprises a shaft mounted on the support for rotation on an axis substantially parallel to the support.

6. The two-way gang plow of claim 1 including vertical pivot means mounting the carrier wheel on the support, and link means connected at one end to the vertical pivot means and arranged for connection at the opposite end to a pulling vehicle for effecting turning of the carrier wheel means in response to turning of the vehicle.

7. The two-way gang plow of claim 1 including a carrier wheel support arm mounted on the rear end of the support for pivotal movement on a substantially horizontal axis, and means mounting the carrier wheel on the arm.

8. The two-way gang plow of claim 1 including
   a. a carrier wheel support arm mounted on the rear end of the support for pivotal movement on a substantially horizontal axis,
   b. vertical pivot means mounting the carrier wheel on the arm,
   c. steering bracket means mounted on the support for pivotal movement on a vertical axis,
   d. first link means,
   e. pivot means connecting one end of the first link means to the vertical pivot means,
   f. universal pivot means connecting the opposite end of the first link means to the steering bracket means on the pivot axis of the arm, and
   g. second link means connected pivotally at one end to the steering bracket means and arranged for connection at its opposite end to a pulling vehicle.

9. The two-way gang plow of claim 8 wherein the second link means is arranged for connection to a pulling vehicle to the side of the support opposite the pivot connections to the steering bracket means, whereby turning of the pulling vehicle in one direction effects turning of the steering wheel means in the opposite direction.

10. The two-way gang plow of claim 1 including power means interengaging the support and framework for rotating the latter selectively between the ground working positions of the two gangs.

* * * * *